US012731085B2

(12) United States Patent
Myers et al.

(10) Patent No.: US 12,731,085 B2
(45) Date of Patent: *Sep. 8, 2026

(54) DATA MODIFICATION OPERATORS FOR REDUCING BIAS IN MACHINE LEARNING AND ARTIFICIAL INTELLIGENCE MODELS

(71) Applicant: Citibank, N.A., New York, NY (US)

(72) Inventors: James Randolph Myers, Clearwater Beach, FL (US); William Franklin Cameron, Clearwater, FL (US)

(73) Assignee: CITIBANK, N.A.

( * ) Notice: Subject to any disclaimer, the term of this patent is extended or adjusted under 35 U.S.C. 154(b) by 0 days.

This patent is subject to a terminal disclaimer.

(21) Appl. No.: 19/646,157

(22) Filed: Apr. 13, 2026

(65) Prior Publication Data

US 2026/0236854 A1 Aug. 13, 2026

Related U.S. Application Data

(63) Continuation of application No. 18/783,409, filed on Jul. 25, 2024, now Pat. No. 12,602,623.

(51) Int. Cl.
*G06N 20/20* (2019.01)
*G06N 5/04* (2023.01)

(52) U.S. Cl.
CPC ............... *G06N 20/20* (2019.01); *G06N 5/04* (2013.01)

(58) Field of Classification Search
CPC ................................ G06N 20/20; G06N 5/04
See application file for complete search history.

(56) References Cited

U.S. PATENT DOCUMENTS

2020/0218940 A1* 7/2020 Anglin .................. H04L 9/0637
2021/0319333 A1* 10/2021 Lee ...................... G06N 3/0499
2022/0156646 A1* 5/2022 Farrar .................... G06N 20/00
2024/0160902 A1* 5/2024 Padgett .................. G06N 20/00

OTHER PUBLICATIONS

Tiku, Nitasha, et al., “What AI thinks a beautiful woman looks like,” The Washington Post, May 21, 2024, retrieved Aug. 19, 2024, https://www.washingtonpost.com/technology/interactive/2024/ai-bias-beautiful-women-ugly-images/.
U.S. Appl. No. 18/653,858, entitled “Layered Multi-Prompt Engineering for Pre-Trained Large Language Models” filed May 2, 2024.

(Continued)

*Primary Examiner* — Sehwan Kim
(74) *Attorney, Agent, or Firm* — Perkins Coie LLP

(57) ABSTRACT

A system generates data modification operators that reduce bias or distortions in artificial intelligence (AI) models. The system uses a first artificial intelligence (AI) model to generate outputs based on a set of corresponding inputs to the first AI model. First measurement values of one or more model output metrics in the outputs generated by the first AI model are received. Based on the first measurement values, the system generates a set of data modification operators that specifies one or more operations for modifying inputs to a second AI model. Inputs to the second AI model can be modified using the set of data modification operators to generate a modified set of corresponding inputs. The second AI model can then be applied to the modified set of corresponding inputs to the second AI model.

20 Claims, 5 Drawing Sheets

(56) References Cited

OTHER PUBLICATIONS

U.S. Appl. No. 18/759,648, entitled "Layered Measurement, Grading and Evaluation of Pretrained Artificial Intelligence Models" filed Jun. 28, 2024.
U.S. Appl. No. 18/759,617, entitled "Layered Multi-Prompt Engineering for Pre-Trained Large Language Models" filed Jun. 28, 2024.
Hort, Max, et al. "Bias mitigation for machine learning classifiers: a comprehensive survey." ACM Journal on Responsible Computing 1.2 (2024): 1-52. (Year: 2024).
Naseer, Mahum, et al. "UnbiasedNets: a dataset diversification framework for robustness bias alleviation in neural networks." Machine Learning 113.5 (2024): 2499-2526. (Year: 2024).

* cited by examiner

DATA MODIFICATION OPERATORS FOR REDUCING BIAS IN MACHINE LEARNING AND ARTIFICIAL INTELLIGENCE MODELS

CROSS-REFERENCE TO RELATED APPLICATIONS

This application is a continuation of U.S. patent application Ser. No. 18/783,409 entitled "DATA MODIFICATION OPERATORS FOR REDUCING BIAS IN MACHINE LEARNING AND ARTIFICIAL INTELLIGENCE MODELS," filed on Jul. 25, 2024. The content of the foregoing application is incorporated herein by reference in their entirety.

BACKGROUND

Artificial intelligence and machine learning models are becoming increasingly ubiquitous, playing a critical role in decision making across many different domains. As reliance on these models increases, it becomes increasingly important to ensure that the models can produce outputs that are not skewed, flawed, or otherwise biased.

BRIEF DESCRIPTION OF THE DRAWINGS

Detailed descriptions of implementations of the present invention will be described and explained through the use of the accompanying drawings.

Figure 1:
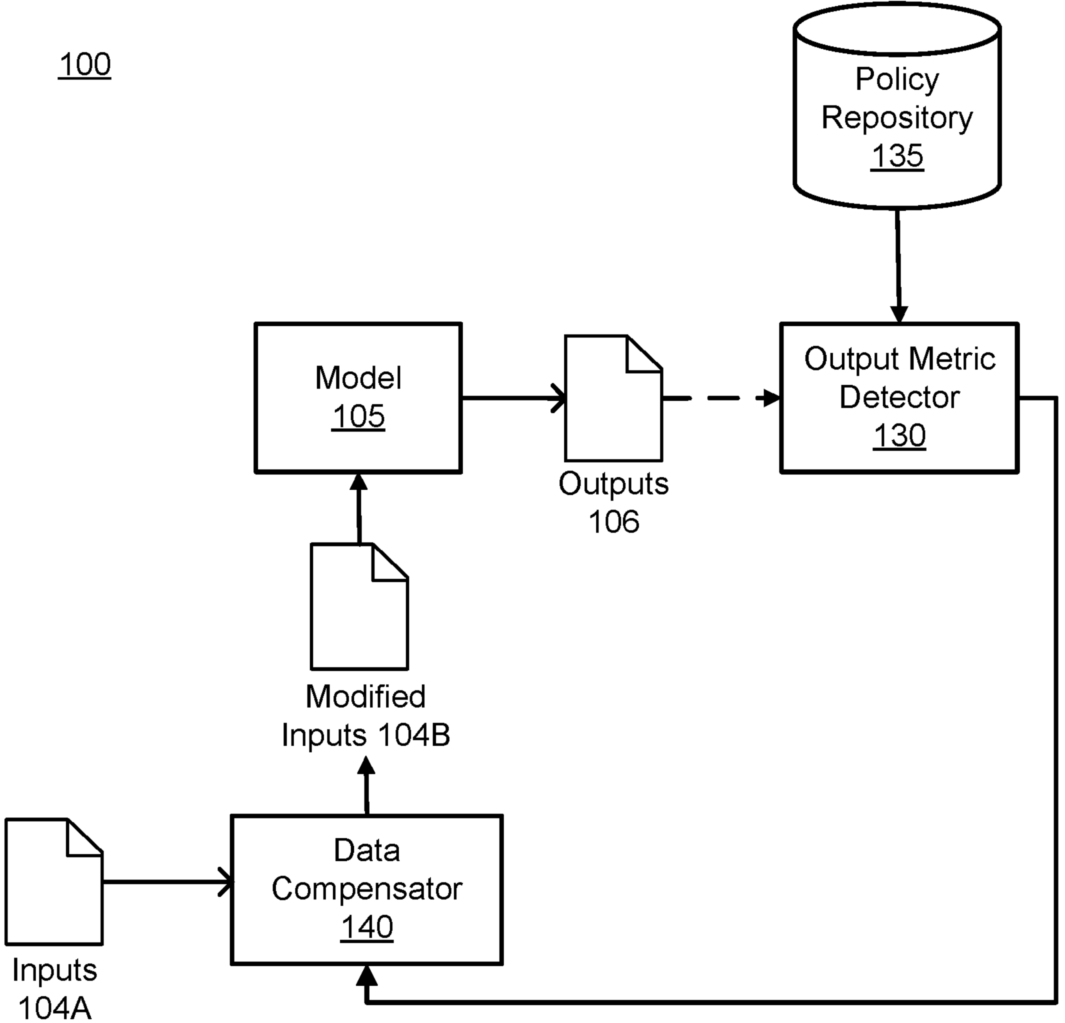
FIG. 1 is a schematic diagram illustrating an environment in which artificial intelligence and/or machine learning models are applied, according to some implementations.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Artificial Intelligence (AI) models are dependent on the data ingested. The data ingested is often inaccurate, incomplete, and distorted reflecting obsolete facts, constrained viewpoints, or bias. In order to deal with the limitations of the data ingested, several technical approaches are in use. The AI model(s) can be manipulated such as by changes in weights or bias, and the model(s) can be trained or retrained to account for data limitations. The outputs of AI models can be altered by injecting additional or more focused information into the AI model(s) such as by retrieval-augmented generation (RAG) or prompt engineering techniques. The outputs of AI model can be subjected to filters such as content filters designed to block or adjust the output to prevent undesired outcomes or improve desired outcomes. Synthetic data can be created and used to change the processing of AI model(s). The synthetic data is used by the AI model(s) as equivalent to actual data for purposes of training, testing, fine tuning, and inferencing. Tracing the lineage/provenance of synthetic data is problematic and once injected into a model can often be difficult to remove or compensate for in the event of flaws or needed changes in the synthetic data.

To solve these problems, a solution is proposed in which data is adjusted using a variety of methods to account for the model's inaccurate, incomplete, or distorted results. The adjusted data is then used by the AI model(s) for inferencing. The original data is maintained and available for use and examination. Adjustments to the data can be achieved by a variety of technical means such as by linking the adjustments to the original data in the form of metatags, tokens, lookup tables, or similar means. Given the large quantity of data ingested by AI model(s), such adjustments are accomplished by automated means such as by the use of other AI model(s), quantitative algorithms, or rules engines. An explainability layer can be added to these automated means that explain why decisions are being made as they are. As data is pre-processed via these automated means and input to a model, the explainability layer can indicate how the data has been modified (e.g., which features have been added, removed, or altered), and why the data has been modified (e.g., identifying a policy that provided the basis for modifying the data). These approaches have a number of technical advantages. The AI model(s) use the adjusted data and can thus avoid some of the problems associated with inaccurate, incomplete and distorted data. The original, unadjusted data that is linked to the adjusted data and the remediation model's logic is preserved and continues to be available for auditing and explainability of AI model outcomes. As information and circumstances change, the adjustment factor and adjustment methodology can be revamped to reflect such changes while preserving the original data and also the data lineage/provenance.

This solution is broadly applicable to the field of data science and to AI model(s). Potential applications are apparent in the fields of population studies, modeling human behavior, life sciences, physics and weather forecasting. Actual historical data, despite its limitations, can be combined with current modeling insights and principles to produce more useful outputs from AI model(s). As information changes, discoveries are made, and viewpoints shift, the original data can be further adjusted and used to obtain improved outcomes. For example, historical population studies often do not include statistically appropriate representations of gender and ethnic origin. Additionally, such historical studies implicitly incorporate bias that is later deemed illegal or inappropriate. This technical solution offers the opportunity to adjust the data used in AI model(s) to comply with current laws and ethical principles, and comply in the future in the event of changes in law, rules or societal norms.

According to some implementations, a computer system receives first measurement values of one or more model output metrics in the first set of outputs generated by a first AI model and generates a set of data modification operators, based on the first set of measurement values of one or more model output metrics, that specifies one or more operations for modifying the set of corresponding inputs to the AI model. The computer system can then modify the set of corresponding inputs to a second AI model using the set of data modification operators to generate a modified set of corresponding inputs to the second AI model. The second AI model can be applied to the modified corresponding set of inputs to generate a second set of outputs. The first AI model and the second AI model can be the same, or different from each other.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

FIG. 1 is a schematic diagram illustrating an environment 100 in which artificial intelligence and/or machine learning models are applied, according to some implementations.

As shown in FIG. 1, the environment 100 includes an artificial intelligence (AI) model 105, which can be a machine learning model or a model that is not based on machine learning. The AI model 105 is generally configured to process inputs 104 to produce corresponding outputs 106, where the outputs 106 can include, for example, predictions that are generated based on the inputs 104 or classifications of the inputs 104.

The AI model 105 can refer to a construct that is trained using training data to make predictions or provide probabilities for new data items, whether or not the new data items were included in the training data. For example, training data for supervised learning can include items with various parameters and an assigned classification (e.g., financial profiles of customers and a classification that approves or denies these customers for a loan). A new data item can have parameters that a model can use to assign a classification (e.g., loan approval or denial) to the new data item. As another example, a model can be a probability distribution resulting from the analysis of training data, where the probability distribution is used, for example, to set insurance rates for a customer based on the likelihood that the customer will experience certain covered events. Examples of types of models include neural networks, support vector machines, decision trees, Parzen windows, Bayes, clustering, probability distributions, decision trees, decision tree forests, and others. The AI model 105 can be configured for various situations, data types, sources, and output formats. Other implementations of the AI model 105 include generative models, such as large language models or image generation models, as well as AI models that do not necessarily entail machine learning, such as expert systems or rules engines. Generative models are trained to learn underlying patterns and distributions in a latent space of training data, enabling the models to generate new, synthetic data samples that are not present in the training data but that resemble or are consistent with learned patterns in the original data.

An output metric detector 130 detects output metrics in the model outputs 106 and/or in model inputs 104. The output metric detector 130 can be a computer system or a set of instructions or operations that are executed or performed by a computer system. Output metrics can represent systematic errors, falsehoods, distortions, omissions, bias, and/or prejudices in the model outputs or model inputs that do not reflect the true characteristics of the population or phenomenon being modeled or that contravene a policy or regulation. These distortions can arise from various sources, such as sampling errors, measurement errors, historical prejudices embedded in training data, or changing policies or regulations. It can result in the model making skewed predictions that favor or disadvantage certain groups or outcomes, thereby affecting the model's fairness and reliability.

Distortions in models or outcomes can be caused by any of a variety of factors. Some distortions can result when certain characteristics are included in (or excluded from) data input values, causing the AI model to incorrectly make inferences based on (or without considering) these characteristics. For example, if a loan approval model is trained using data that includes applicants' zip codes, the model may form anomalous inferential links between geographic location and ability to repay the loan, leading to biased outcomes against certain neighborhoods that cause at least some qualified applicants from these neighborhoods to be denied loan approvals. Similarly, distortions can result when a data set overwhelmingly includes data items with certain characteristics or does not include many or any data items with other characteristics. For example, if a model for generating images of people is trained using primarily people from one ethnic background or with one body type, the model may not be capable of generating images of people of other ethnicities or with other body types. Distortions can also result when model output values are systematically misclassified, devalued, or overvalued. For instance, if a job performance evaluation model is trained on data where the achievements of a particular gender are consistently rated lower than those of another gender, the model may similarly systematically undervalue the performance of individuals from the lower-ranked gender. Furthermore, distortions can result when a policy or regulation changes how features or outputs should be treated. For example, a movie recommendation platform may implement a new policy to not consider users' ages when recommending movies (e.g., based on a determination that its recommendation models were not capturing the diverse movie-watching interests of users of all ages), creating a need to modify the data input to the model to no longer include age as a feature.

In some implementations, the output metric detector 130 receives output metrics in a dataset, such as a set of inputs 104 or a set of outputs 106, from an external source. For example, a third party can perform an analysis to evaluate whether the outputs 106 conform to certain principles of fairness, comply with certain regulations, or exhibit certain statistical distortions. These analyses can be attached to a set of input data as a data "nutrition label," in some examples.

Other implementations of the output metric detector 130 performs statistical analyses of the model inputs 104 or model outputs 106 (which can be generated by model 105, or other, different model(s) not shown in the figure) to detect whether and how data is biased, distorted, or otherwise generally different from the desired outputs. In some cases, the output metric detector 130 can detect a first subset of the outputs 106 that are generated based on inputs 104 that share a common characteristic. For example, when the model 105 is used to process information about people (e.g., their approval for a loan), the output metric detector 130 identifies a set of people that share a common race, gender, age, occupation, or geographic location. The output metric detector 130 then identifies model outputs 106 for people who do not share the common characteristic. If the output metric detector 130 identifies a statistically significant difference between the outputs generated for the people who share the common characteristic and the outputs generated for the people who do not share that characteristic, the output metric detector 130 can determine that the outputs are biased. In other implementations, the output metric detector 130 identifies significant variations in data over time. For example, the detector 130 compares a set of input data points with a certain characteristic that were collected during one year to a set of input data points with the characteristic collected during a different year (e.g., ten years later). If the input data points in the different sets were classified differently or caused different decisions to be made, the output metric detector 130 can generate an output metric that reflects this temporal variation in the data. In other implementations, the output metric detector 130 prompts a large language model to identify differences between historical data as it was applied at a certain time in the past (e.g., when the data was first created) compared to how it would be applied today. In some cases, these differences identified by the large language model can be used as a starting point for conducting a statistical analysis of a data set to determine if the data set exhibits statistically significant biases or distortions along the dimension(s) identified by the LLM. Other example processes for identifying distortions in a data set and compensating for these distortions are described in U.S. patent application Ser. No. 18/653,858, filed May 2, 2024, U.S. patent application Ser. No. 18/759,617, filed Jun. 28, 2024. U.S. patent application Ser. No. 18/759,648, filed Jun. 28, 2024, each of which is incorporated herein by reference in its entirety.

Based on its own analysis or based on information received from external sources, the output metric detector 130 can generate or access output metrics for a data set. The output metrics can include any quantifiable, qualifiable, or logical representation of the differences between actual and desired outputs from a model. For example, a measurement of bias can be a Boolean value that indicates whether bias is present or absent. Other output metrics indicate the characteristic of the input values that is associated with biased results. Still other output metrics are numerical values based on the difference between model outputs for one set of input data and model outputs for another set of input data. For example, if a model used to generate credit scores for credit applicants systematically produces credit scores that are 20 points lower for applicants of a certain race or in a certain geographic area than for applicants of other races or from other geographic areas, the output metric can include or be based on the 20-point numerical difference. In another example, if a resume screening model that classifies job applicants as qualified or unqualified for the job classifies applicants from a certain educational background as unqualified at a higher rate than applicants from other educational backgrounds, the output metric can include or be based on the different classification rates.

The output metric detector 130 can generate or receive multiple output metrics for the same data set. Multiple output metrics can account for changes in data over time, in one example. In other cases, multiple output metrics can account for biases or distortions along multiple dimensions. For example, a model that produces credit scores for credit applicants may produce biased outputs when the applicants have multiple shared characteristics.

The output metric detector 130 can analyze data sets on a periodic basis. For example, the output metric detector 130 can periodically analyze a set of outputs 106 from the model 105 to identify any systematic distortions in the outputs that are tied to certain input characteristics. Additionally or alternatively, the output metric detector 130 can analyze the outputs or inputs upon receiving an instruction from a user.

For example, when an organization operating the output metric detector 130 implements a new policy, the output metric detector 130 can be operated to detect outputs that do not conform to the new policy.

The output metric detector 130 can identify distortions in a model's outputs using compliance, policy, or business goals documentation stored in a policy repository 135. The output metric detector 130 can access policies, business goals, or other relevant documentation in the policy repository 135 that specifies parameters for model outputs using techniques such as retrieval augmented generation (RAG). Using the retrieved documentation, the output metric detector 130 defines logic for modifying inputs to a model such that the resulting outputs comply with the documentation. This logic can together be represented as a data compensator 140, which can include a versioned library of layers, layer functions, and model functions that together operate to modify data input to a model. The data compensator 140 can further include a layer of explainability, generated by a large language model that analyzes the model itself, the documentation, output metrics, or other data to explain why and how the data compensator 140 modifies data input to the model.

The data compensator 140 includes one or more data modification operators for counteracting bias detected in models' outputs. The data compensator 140 can use or apply another AI model, one or more algorithms, or one or more rules to modify a data set to counteract bias.

Data modification operators can be applied to model inputs 104 before the inputs are processed by the model 105. In some implementations, the data compensator generators modified inputs 104B by applying a modification operator to original inputs 104A. For example, a model can be represented as Fi (n)=OB, where Fi is the initial model, n is the initial input data, and OB is the original (biased) outcome. The data modification operator can be a function FR that is applied to the initial data, such that the model becomes Fi (FR (n))=OD, where is the new (desired) outcome.

The operations specified by the modification operator can take any of a variety of forms. For example, one operation can modify input values by a specified compensation value, where the compensation value can include any function applied to the value of the input data items (e.g., adding or subtracting a specified quantity from the value, multiplying or dividing the value by a specified quantity, performing an exponentiation on the value, or a combination of a multiplication/division, addition/subtraction, exponentiation, or other algebraic operations). Other example operations include modifying the features that are included in input data items. These modifications can include, for example, removing features from consideration, adding features to the inputs, or modifying values of the features in the inputs. By way of example, if a model is determined to provide preferential treatment or outcomes for men, the modification operators can modify the gender parameter of input data associated with a woman to instead identify her as a man, in order to rectify the historical bias in the model. In another example, an organization may implement a policy to benefit people who had felony convictions more than ten years' prior and no recidivism since, as part of an effort to help people who are turning their lives around. In this case, the data modification operator may decrease a debt-to-income ratio of a person with a felony conviction when the person's information is input to a model that is used to approve or deny a loan. Modifications can also account for historical trends and events. For example, a modification operator can adjust currency values for inflation, adjust for comparative socio-economic statuses of different occupations at different times, adjust for demographic or socio-economic shifts over time of the population of certain cities or neighborhoods, adjust for new occupations becoming available and old occupations becoming obsolete, or adjust for shifting policies, regulations, or moral sensibilities. When used to modify input data, the data modification operator can cause the model to output an explanation of how the initial model was biased and what operation was performed to reduce the bias or to bias the outputs in a desired direction.

Instead of modifying input data, the data compensator 140 can modify testing data that is used to test the model 105. The data compensator 140 can also modify data used for inferencing, retrieval-augmented generation (RAG), prompt engineering, fine tuning, or otherwise modifying the model 105.

In some implementations, the data compensator 140 generates a new data modification operator or set of modification operators whenever the output metric detector 130 detects output metrics that exceed a specified threshold, where the threshold can be specified for different types and magnitudes of output metrics. In other cases, a new data modification operator is generated on a periodic basis, or in response to certain inputs (e.g., an enactment of a new policy or regulation). Furthermore, as inputs to the model 105 are processed through the data compensator 140 and the model 105 over time, the data compensator 140 can be modified based on new or existing distortions detected in the resulting outputs.

The data compensator 140 can further store a set of metadata that indicates one or more associations between an original input data set (e.g., before being input to the data compensator 140) and a modified data set (e.g., as resulting from application of the data compensator 140 to the original input data set). The associations can identify, for example, one-to-one, one-to-many, or many-to one associations between original input data points or sets and modified data points or sets; hierarchical or graphical associations between sources of the original and modified data points; associations between contexts in which the original and modified input data sets are applied; or any other associations between data points, data sets, data sources, or how the data sets are used. Furthermore, as models are used and data and policies evolve over time, multiple data compensators can be generated to modify data sets in different ways. Metadata can store the associations between each of these progressively modified data sets to ensure providence and traceability of the modified data sets and to facilitate auditing of why and how the data was modified at each step.

Modifying Data for AI Models

Figure 2:
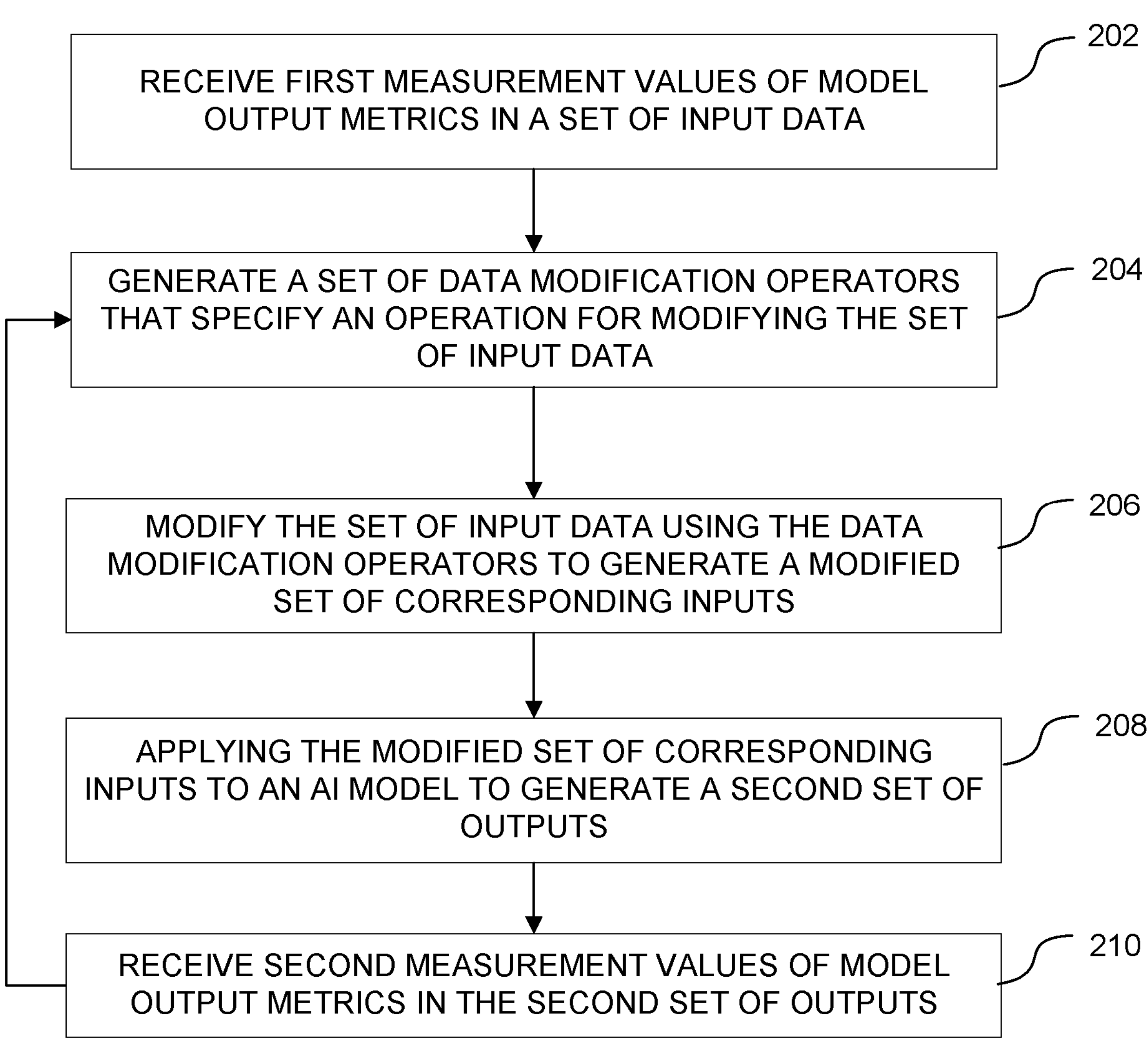
FIG. 2 is a flowchart illustrating a process for modifying output metrics in artificial intelligence models, according to some implementations.

FIG. 2 is a flowchart illustrating a process 200 for modifying data in AI models to reduce bias, distortions, or other differences between actual and desired model outputs, according to some implementations. The process 200 can be performed by one or more computing systems, such as the output metric detector 130, and/or the data compensator 140 described with respect to FIG. 1, or a computer system that implements one or more of their operations. The process 200 can include additional, fewer, or different steps in other implementations, or can perform the steps in different orders.

At 202, the computer system receives first measurement values of model output metrics in a set of input data. The first measurement values can be generated by the computer system itself (e.g., based on outputs generated by a first AI model) or received from an external source. For instance, the computer system uses a first AI model to generate first outputs based on a set of corresponding first inputs to the model. The computer system can deploy the first model for use to process operational inference data and to produce outputs that facilitate or cause decisions or actions. Alternatively, the first AI model can be deployed in a shadow testing configuration, where operational inference data is copied and processed through the model to determine differences between outputs produced by the model and decisions or actions that result from other processes. In some examples, the inputs to the model can each be a vector or a set of features or characteristics of a person, thing, or event, while the outputs are a classification or prediction generated based on the features or characteristics in the inputs. The output metrics can be obtained directly from the outputs themselves, or can be inferred based on metrics in the input data.

At 204, the computer system generates a data compensator for modifying data input to a model (the set of input data). The data compensator can include a set of one or more data modification operators or a data modification operator model generated based on the first measurement values, where each modification operator or the operator model specifies an operation for modifying at least a portion of the inputs to the model. In some implementations, the system generates a set of data modification operators based on evaluation of existing data (including, for example, the set of input data) that may or may not have been used by another model to generate outputs. For example, the system performs time series analysis on the existing data, compares it to other data, performs statistical analysis of existing data, and so on to generate the data compensator.

The computer system then modifies the set of input data, at 206, using the data compensator. When modifying the input data, the computer system can generate a copy of at least a subset of the original input data, such that the original input data remains unaltered. The computer system can store both the original input data and the modified input data to facilitate later auditing of the data compensator, the first AI model, the outputs produced using the modified input data, or any actions taken based on the outputs produced when the first AI model is applied to the modified input data. Furthermore, the modified set of input data can include copies of the input data previously processed through the AI model (e.g., to generate new outputs based on the same inputs), or copies of new input data that has not previously been input to the AI model.

At 208, the computer system applies the modified set of corresponding inputs to a second AI model to generate a second set of outputs. The second AI model can be the same as the first AI model or can be a different model from the first AI model. The computer system can then receive, at 210, a second set of measurement values of the model output metrics based on the second set of outputs. The second set of measurement values are different from the first set of outputs. For example, because the inputs are modified, the second set of outputs may have a lower measurement of bias than the first set of outputs.

The computer system can iteratively perform steps in the process 200. For example, the system can generate a first data compensator that specifies a first operation to perform on data set of data. Based on the second set of outputs, the computer system can determine whether the second measurement values satisfy a criterion, such as detecting whether bias or other distortions are still present in the second set of outputs or whether the model output metrics exceed a specified threshold. If the second measurement values do not satisfy a criterion, the computer system generates a second data compensator specifying a second operation to perform on the input data, where the second operation can include, for example, removing a different characteristic from the input data set than was removed by the first operation, adding a different characteristic, adjusting values within the input data by a different amount, or a combination of two or more of these operations. This iterative process can be repeated until a data compensator is generated that causes the model outputs to satisfy a criterion associated with the model output metrics.

Example AI Models

Figure 3A:
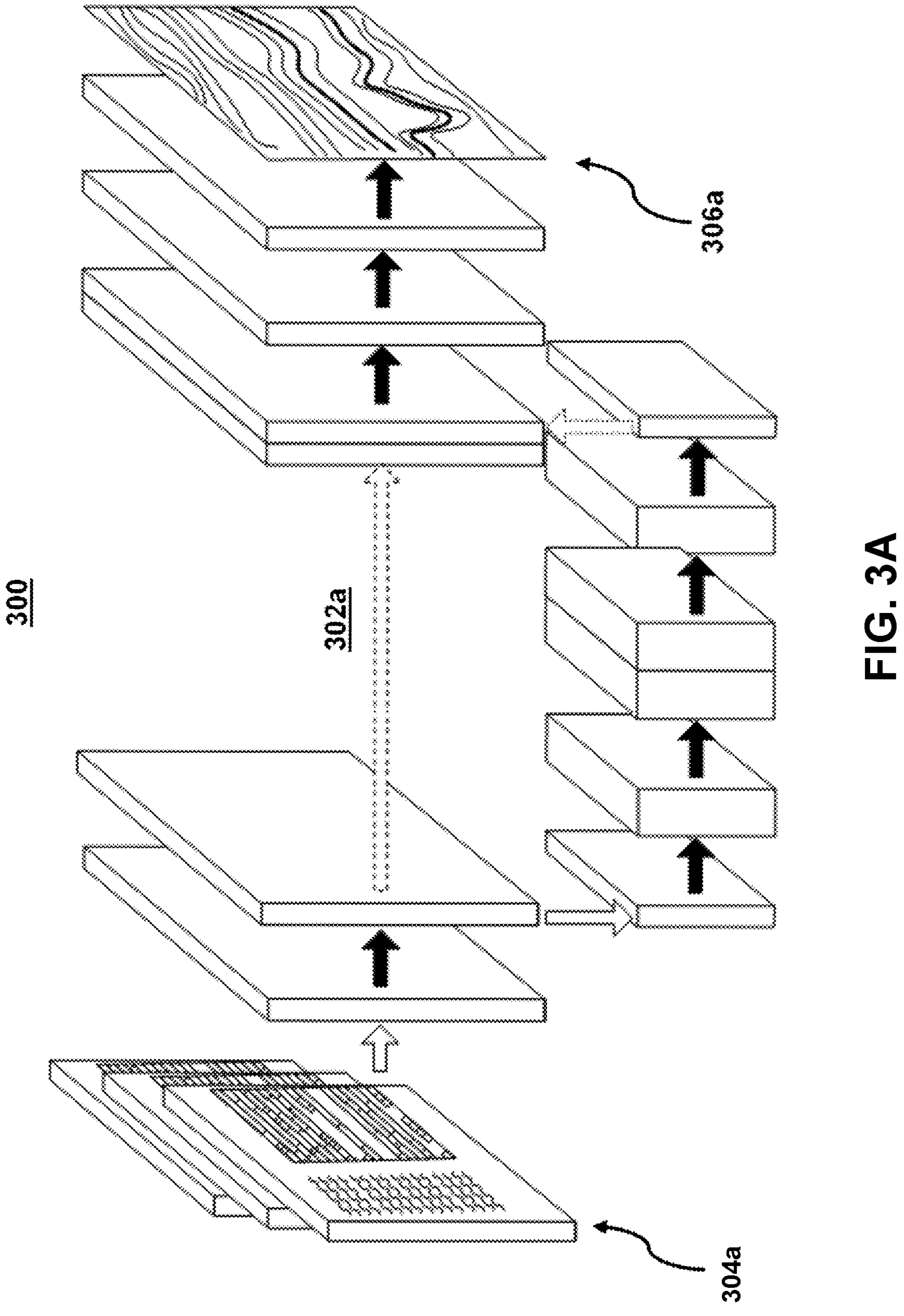
FIGS. 3A-3B illustrates an example system architecture of a machine learning model, according to some implementations.
Figure 3B:
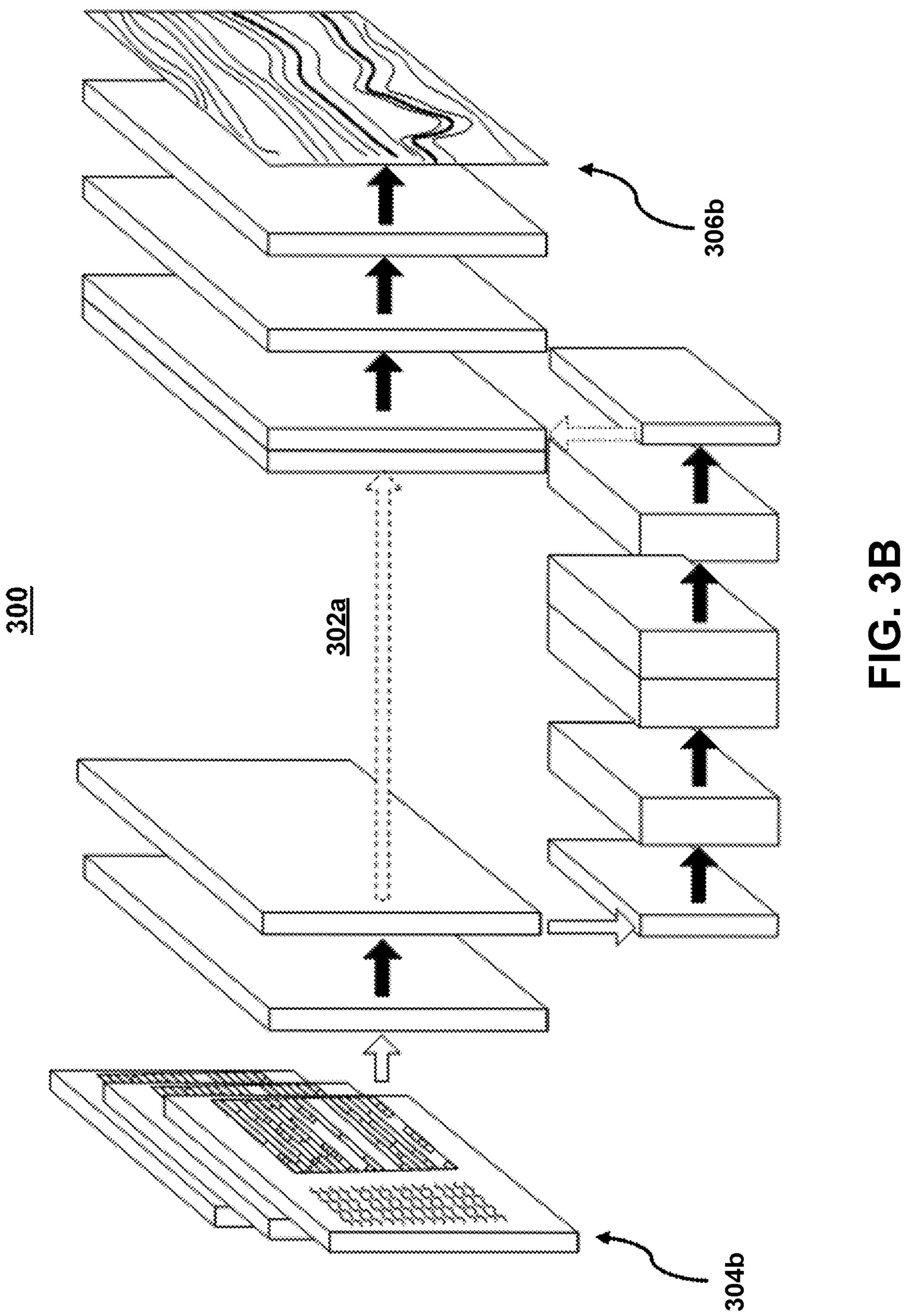

FIGS. 3A-3B illustrate an example system architecture 300 of a machine learning model, which can be used as an example of the AI model 105 according to some implementations.

As shown in FIG. 3A, the architecture 300 includes model 302*a*, which may be a machine learning model, an artificial intelligence model, etc. (which may be referred to collectively as "models" herein). Model 302*a* may take inputs 304*a* and provide outputs 306*a*. Each of the plurality of datasets (e.g., inputs 304*a*) may include data subsets related to user data, predicted forecasts and/or errors, and/or actual forecasts and/or errors. In some implementations, outputs 306*a* may be fed back to model 302*a* as input to train model 302*a* (e.g., alone or in conjunction with user indications of the accuracy of outputs 306*a*, labels associated with the inputs, or other reference feedback information). For example, the system may receive a first labeled feature input, wherein the first labeled feature input is labeled with a known prediction for the first labeled feature input. The system may then train the first model to classify the first labeled feature input with the known prediction.

In a variety of implementations, model 302*a* may update its configurations (e.g., weights, biases, or other parameters) based on the assessment of its prediction (e.g., outputs 306*a*) and reference feedback information (e.g., user indication of accuracy, reference labels, or other information). In a variety of implementations, where model 302*a* is a neural network, connection weights may be adjusted to reconcile differences between the neural network's prediction and reference feedback. In a further use case, one or more neurons (or nodes) of the neural network may require that their respective errors be sent backward through the neural network to facilitate the update process (e.g., backpropagation of error). Updates to the connection weights may, for example, be reflective of the magnitude of error propagated backward after a forward pass has been completed. In this way, for example, the model 302*a* may be trained to generate better predictions.

In some implementations, the model (e.g., model 302*a*) automatically performs actions based on output 306*a*. Alternatively the model (e.g., model 302*a*) does not perform any actions. The output of the model (e.g., model 302*a*) can be used to make decisions or to cause actions. For example, a model trained to process loan applicant data generates decisions approving or denying an applicant for a loan, or provides outputs that are used by a human reviewer or another system to determine whether to approve or deny the loan.

As described above, when biases or distortions are detected in inputs to or outputs generated by an AI model, a data compensator can be generated to mitigate these distortions. FIG. 3B illustrates an example of the architecture 300 in which modified input data 304*b* is input to model 302*a*, where the modified input data is generated based on a data compensator that can include one or more data modification operators.

In some implementations, a difference between the outputs 306*b* and the outputs 306*a* can be used to generate model output metrics, for example by measuring whether bias is present in the model 302*a* or whether the data compensator was effective in reducing bias. For example, if a bias is detected in the outputs 306*a*, the outputs 306*b* can be evaluated to determine if the same bias exists. If the bias in the outputs 306*b* is below a specified threshold, the data compensator can be stored in association with the model 302*a* such that the data compensator can be used to modify subsequent inputs to the model. The outputs 306*b* can also be compared to the outputs 306*a* to evaluate whether the data compensator introduced new biases or distortions to the model 302*a* that should be corrected by modifying the original data compensator or creating a new data compensator to further modify input data.

Computer System

Figure 4:
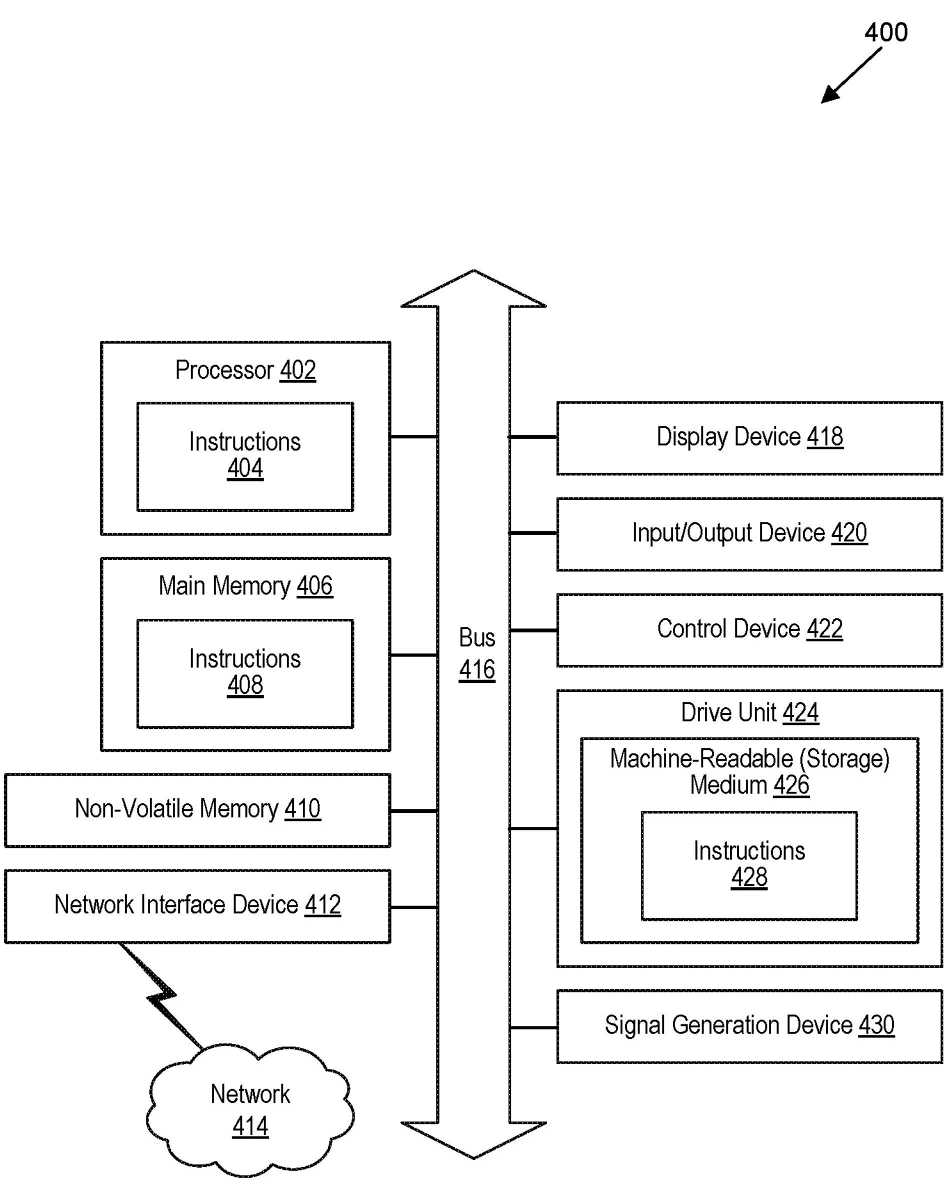
FIG. 4 is a block diagram that illustrates an example of a computer system in which at least some operations described herein can be implemented.

FIG. 4 is a block diagram that illustrates an example of a computer system 400 in which at least some operations described herein can be implemented. As shown, the computer system 400 can include: one or more processors 402, main memory 406, non-volatile memory 410, a network interface device 412, video display device 418, an input/output device 420, a control device 422 (e.g., keyboard and pointing device), a drive unit 424 that includes a storage medium 426, and a signal generation device 430 that are communicatively connected to a bus 416. The bus 416 represents one or more physical buses and/or point-to-point connections that are connected by appropriate bridges, adapters, or controllers. Various common components (e.g., cache memory) are omitted from FIG. 4 for brevity. Instead, the computer system 400 is intended to illustrate a hardware device on which components illustrated or described relative to the examples of the figures and any other components described in this specification can be implemented.

The computer system 400 can take any suitable physical form. For example, the computing system 400 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 400. In some implementation, the computer system 400 can be an embedded computer system, a system-on-chip (SOC), a single-board computer system (SBC) or a distributed system such as a mesh of computer systems or include one or more cloud components in one or more networks. Where appropriate, one or more computer systems 400 can perform operations in real-time, near real-time, or in batch mode.

The network interface device 412 enables the computing system 400 to mediate data in a network 414 with an entity that is external to the computing system 400 through any communication protocol supported by the computing system 400 and the external entity. Examples of the network interface device 412 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 406, non-volatile memory 410, machine-readable medium 426) can be local, remote, or distributed. Although shown as a single medium, the machine-readable medium 426 can include multiple media (e.g., a centralized/distributed database and/or associated caches and servers) that store one or more sets of instructions 428. The machine-readable (storage) medium 426 can include any medium that is capable of storing, encoding, or carrying a set of instructions for execution by the computing system 400. The machine-readable medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computing system 400 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any specific portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A computer-implemented method for reducing bias within model input data, the method comprising:

receiving an output dataset generated by a first artificial intelligence (AI) model using an input dataset;

detecting, from the input dataset, a first input data subset that shares a common characteristic and a second input data subset that does not share the common characteristic, wherein the first input data subset corresponds to a first output data subset of the output dataset, and wherein the second input data subset corresponds to a second output data subset of the output dataset;

generating at least one model bias metric of the output dataset generated by the first AI model based on an identified statistical difference between the first output data subset and the second output data subset; and responsive to the at least one model bias metric failing to satisfy a data bias tolerance value, updating the input dataset to reduce the at least one model bias metric by iteratively performing operations comprising:

generating, via inputting the at least one model bias metric into a second AI model, at least one data modification operator that adjusts the input dataset for the first AI model by performing one or more of:

(1) removing the common characteristic from the input dataset, (2) generating a new characteristic of the input dataset, or (3) applying a compensation value on the input dataset, wherein the second AI model is modified based on distortions detected in the output dataset;

applying the at least one data modification operator to the input dataset of the first AI model to generate a modified input dataset for the first AI model; and inputting the modified input dataset into the first AI model to generate a modified output dataset that comprises a lower measurement of bias compared to the output dataset; and updating the at least one model bias metric in the modified output dataset based on a statistical difference between subsets of the modified output dataset.

2. The computer-implemented method of claim 1, wherein the modified input dataset is generated for a third AI model separate from the first AI model, and wherein the modified output dataset is generated via inputting the modified input dataset into the third AI model.

3. The computer-implemented method of claim 1, wherein the input dataset is stored prior to the modified input dataset.

4. The computer-implemented method of claim 1 further comprising:

storing a metadata set indicating one or more associations between the input dataset and the modified input dataset.

5. The computer-implemented method of claim 1, wherein the modified input dataset comprises a modified feature set, and wherein the method further comprises:

removing, using the at least one data modification operator, one or more selected features from an feature set of the input dataset.

6. The computer-implemented method of claim 1, wherein the modified input dataset comprises a modified feature set, and wherein the method further comprises:

adding, using the at least one data modification operator, one or more additional features to an initial feature set of the input dataset.

7. The computer-implemented method of claim 1 further comprising:

modifying, using the at least one data modification operator, the input dataset by the compensation value.

8. The computer-implemented method of claim 1 further comprising:

removing, from the input dataset, a data subset that has the common characteristic.

9. A system for reducing bias within model input data, the system comprising:

one or more processors; and one or more non-transitory computer-readable storage media storing executable instructions, which, when executed by the one or more processors, cause the system to:

receive an output dataset generated by a first artificial intelligence (AI) model using an input dataset;

detect, from the input dataset, a first input data subset that shares a common characteristic and a second input data subset that does not share the common characteristic, wherein the first input data subset corresponds to a first output data subset of the output dataset, and wherein the second input data subset corresponds to a second output data subset of the output dataset;

generate at least one model bias metric of the output dataset generated by the first AI model based on an identified statistical difference between the first output data subset and the second output data subset; and responsive to the at least one model bias metric failing to satisfy a data bias tolerance value, update the input dataset to reduce the at least one model bias metric by iteratively performing operations comprising:

generate, via inputting the at least one model bias metric into a second AI model, at least one data modification operator that adjusts the input dataset for the first AI model by performing one or more of:

(1) removing the common characteristic from the input dataset, (2) generating a new characteristic of the input dataset, or (3) applying a compensation value on the input dataset, wherein the second AI model is modified based on distortions detected in the output dataset;

apply the at least one data modification operator to the input dataset of the first AI model to generate a modified input dataset for the first AI model; and input the modified input dataset into the first AI model to generate a modified output dataset that comprises a lower measurement of bias compared to the output dataset; and update the at least one model bias metric in the modified output dataset based on a statistical difference between subsets of the modified output dataset.

10. The system of claim 9, wherein the modified input dataset is generated for a third AI model separate from the first AI model, and wherein the modified output dataset is generated via inputting the modified input dataset into the third AI model.

11. The system of claim 9, wherein the input dataset is stored prior to the modified input dataset.

12. The system of claim 9 further caused to:

store a metadata set indicating one or more associations between the input dataset and the modified input dataset.

13. The system of claim 9, wherein the modified input dataset comprises a modified feature set, and wherein the system is further caused to:

remove, using the at least one data modification operator, one or more selected features from an feature set of the input dataset.

14. The system of claim 9, wherein the modified input dataset comprises a modified feature set, and wherein the system is further caused to:

add, using the at least one data modification operator, one or more additional features to an initial feature set of the input dataset.

15. The system of claim 9 further caused to:

modify, using the at least one data modification operator, the input dataset by the compensation value.

16. The system of claim 9 further caused to:

remove, from the input dataset, a data subset that has the common characteristic.

17. At least one non-transitory, computer-readable storage medium comprising instructions recorded thereon, wherein the instructions, when executed by at least one data processor of a system, cause the system to:

receive an output dataset generated by a first artificial intelligence (AI) model using an input dataset;

detect, from the input dataset, a first input data subset that shares a common characteristic and a second input data subset that does not share the common characteristic, wherein the first input data subset corresponds to a first output data subset of the output dataset, and wherein the second input data subset corresponds to a second output data subset of the output dataset;

generate at least one model bias metric of the output dataset generated by the first AI model based on an identified statistical difference between the first output data subset and the second output data subset; and responsive to the at least one model bias metric failing to satisfy a data bias tolerance value, update the input dataset to reduce the at least one model bias metric by iteratively performing operations comprising:

generate, via inputting the at least one model bias metric into a second AI model, at least one data modification operator that adjusts the input dataset for the first AI model by performing one or more of:

(1) removing the common characteristic from the input dataset, (2) generating a new characteristic of the input dataset, or (3) applying a compensation value on the input dataset, wherein the second AI model is-configured modified based on distortions detected in the output dataset;

apply the at least one data modification operator to the input dataset of the first AI model to generate a modified input dataset for the first AI model; and input the modified input dataset into the first AI model to generate a modified output dataset that comprises a lower measurement of bias compared to the output dataset; and update the at least one model bias metric in the modified output dataset based on a statistical difference between subsets of the modified output dataset.

18. The at least one non-transitory, computer-readable storage medium of claim 17, wherein the modified input dataset is generated for a third AI model separate from the first AI model, and wherein the modified output dataset is generated via inputting the modified input dataset into the third AI model.

19. The at least one non-transitory, computer-readable storage medium of claim 17, wherein the input dataset is stored prior to the modified input dataset.

20. The at least one non-transitory, computer-readable storage medium of claim 17, wherein the instructions further cause the system to:

store a metadata set indicating one or more associations between the input dataset and the modified input dataset.

* * * * *